(12) United States Patent
Yin

(10) Patent No.: US 6,934,863 B2
(45) Date of Patent: Aug. 23, 2005

(54) ELECTRONIC APPARATUS CAPABLE OF USING AN EXTERNAL POWER SOURCE AND A BUS POWER SOURCE SIMULTANEOUSLY

(75) Inventor: Lao-To Yin, Taoyuan (TW)

(73) Assignee: BENQ Corporation, Taoyuan (TW)

( * ) Notice: Subject to any disclaimer, the term of this patent is extended or adjusted under 35 U.S.C. 154(b) by 502 days.

(21) Appl. No.: 10/267,847

(22) Filed: Oct. 10, 2002

(65) Prior Publication Data

US 2003/0074588 A1 Apr. 17, 2003

(30) Foreign Application Priority Data

Oct. 16, 2001 (TW) ........................................ 90125606 A

(51) Int. Cl.$^7$ .............................................. G06F 1/26
(52) U.S. Cl. ...................................................... 713/300
(58) Field of Search ........................................ 713/300

(56) References Cited

U.S. PATENT DOCUMENTS 6,735,671 B1 * 5/2004 Kida ........................... 711/111
6,810,481 B1 * 10/2004 Kawade et al. ............. 713/300
2001/0003205 A1   6/2001 Gilbert
2002/0023548 A1 * 2/2002 Almeida ....................... 99/450
2005/0050371 A1 * 3/2005 Ono ............................ 713/300

* cited by examiner

Primary Examiner—John R. Cottingham
(74) Attorney, Agent, or Firm—Rabin & Berdo, P.C.

(57) ABSTRACT

An electronic apparatus capable of using an external power source and a power source from a bus, such as a universal serial bus (USB) power source, is disclosed. The external power source and the USB power source output a first and a second operating voltage to the electronic apparatus, respectively. The electronic apparatus includes a first group of devices operative at the first operating voltage, a second group of devices operative at the second operating voltage, and an input power control circuit. The input power control circuit is coupled to the first and second groups of devices, and is capable of being coupled to the external and the USB power sources. The input power control circuit is used for controlling the first and the second operating voltages in order to feed the first and second groups of devices with the first and the second operating voltages, respectively.

5 Claims, 2 Drawing Sheets

ELECTRONIC APPARATUS CAPABLE OF USING AN EXTERNAL POWER SOURCE AND A BUS POWER SOURCE SIMULTANEOUSLY

This application incorporates by reference Taiwan application Serial No. 090125606, filed on Oct. 16, 2001.

BACKGROUND OF THE INVENTION

1. Field of the Invention

The invention relates in general to a scanner, and more particularly to a scanner capable of using an external power source and a bus power source, such as a universal serial bus (USB) power source, simultaneously.

2. Description of the Related Art

Scanners are one kind of peripherals for converting the text or image into a digital representation for the computers to display, edit, store, and output. The scanners expand the functionality of computer systems and bring much convenience to computers' users. Nowadays, the scanner has become a necessity for the home use and the business use.

The USB (Universal Serial bus) is a computer bus standard for communication between a host computer and its various peripherals connected to the computer. Peripherals with USB port have standardized interface for connection. By using USB, the operating host computer and its connected peripherals can communicate one another. In addition, various peripherals can be plugged in, installed, used or unplugged while the host computer is in operation. That is, USB supports the plug-and-play (PnP) function.

The USB cables are used for connecting the host computer and peripherals. A typical USB cable has 4 wires, two of which are power lines; one supplies a DC voltage of 5 V and another is a ground line. The peripheral can be powered via the USB port. In addition, the peripheral can output the power from the USB to the successive electronic peripherals. According to the USB standard, the power provided by USB is 500 mA at 5.0 Volt. Thus, only low-power devices, such as the keyboard, the mouse, and simple speakers, are suitable to be powered by a USB.

As shown in FIG. 1, a conventional scanner 100 is connected to an external power source 106. The scanner 100 consists of many electronic devices. The electronic devices can be simply classified in terms of operating voltages at which the devices are operated. The scanner 100 is thus defined as having a group of high-voltage devices 102 and a group of low-voltage devices 104. Electronic devices in the group of high-voltage devices 102 are mainly operated at 12 V DC, while those in the group of low-voltage devices 104 are mainly operated at 5 V DC. In general, most of the electronic devices of the scanner 100 are operated at either 12 V DC or 5 V DC. In the case of electronic devices operated at 8 V DC or 3 V DC, a voltage converter is used to convert 12 or 5 V DC voltages into 8 or 3 V DC voltages. Henceforth, in this specification, the group of high-voltage devices 102 is defined as the electronic devices that directly or indirectly use 12 V DC voltages, and the group of low-voltage devices 104 is defined as the electronic devices that directly or indirectly use 5 V DC voltages. Additionally, in the scanner 100, the group of high-voltage devices 102 and the group of low-voltage devices 104 are operated independently. Please note that some electronic devices may use DC voltages of 12 V and 5 V simultaneously as their operating voltages. For the sake of simplicity, the details of such electronic devices will not be described.

The conventional way of supplying power to the scanner 100 is to connect the scanner 100 with an external power source 106 for outputting an external voltage, that is, a DC voltage $V_H$ of 12 V. The external power source 106 is commonly an independent AC-to-DC adapter for converting a domestic AC voltage of 100–120 V (or 200–240 V in some countries) into a DC voltage of 12 V The external voltage, $V_H$, outputted by the external power source 106 is directly fed to the group of high-voltage devices 102 to drive the electronic devices operated by 12 V The external voltage, $V_H$, is additionally fed into a voltage converter 108 of the scanner 100. The voltage converter 108 is used for converting the external voltage of 12 V DC into a voltage of 5 V DC, which is referred to as $V_L$. The converted voltage, $V_L$, is then fed to the group of low-voltage devices 104 to drive the electronic devices operated by 5 V.

Referring to FIG. 2, the connection of another conventional scanner 200 and a USB power source 206 is illustrated. In this second example, the scanner 200 obtains its power from the USB connection only. That is, the scanner 200 uses the 5 V DC of the USB when the scanner 200 is connected to the USB, not to an independent AC-to-DC adapter. At this time, the external voltage from the USB power source 206, provided by the power lines of the USB, is equal to $V_L$ and is used as the operating voltage of the group of low-voltage devices 204. The voltage converter 208 is used then to convert the external voltage $V_L$ of 5 V DC into a converted voltage $V_H$ of 12 V DC, and the converted voltage $V_H$ is fed to the group of high-voltage devices 202. For the scanner 200, because the power supplied by the USB power source is very limited, the internal mechanism and power saving of the circuit should be deliberately designed. Accordingly, there is a trade-off between the convenience of using the USB power and the functionality and performance. The use of the USB power source makes the scanner 200 convenient for the user, but the limitations of the USB power source also make less functionality and performance of the scanner 200 than the typical scanner 100 powered by the external power source. Thus, such USB-powered scanners are only advantageous in specific markets. Such scanners can be dedicated to the users of the notebook computers, users who need compact-sized devices, or users who often work in a place without a convenient domestic power supply, etc.

The conventional approaches to supply power to typical scanners have the following disadvantages. First, for one type of scanners, such as the scanner 100, signal distortion may occur in the output signal of the scanner 100 because of a voltage converter. Since the scanner 100 uses an internal voltage converter to convert an external voltage into the necessary voltage for its internal electronic devices, heat dissipation from the voltage converter during voltage conversion would unavoidably raise the inside temperature of the scanner 100, thus resulting in thermal drifting of the internal electronic devices of the scanner 100. In such case, signal distortion would occur when the internal electronic devices of the scanner 100 cannot operate optimally due to the increased inner temperature. Second, another type of scanners, such as the scanner 200, cannot fulfill most users' needs of multi-functionality and high-quality scanners. Although the scanner 200 offers convenient use without needing an external AC-to-DC adapter, its functionality and performance are compromised by the reduced power consumption from the limited power source.

SUMMARY OF THE INVENTION

It is therefore an object of the invention to provide an electronic apparatus, such as a scanner, to achieve the following purposes: (1) reducing power dissipation, (2)

avoiding signal distortion due thermal drifting of the electronic devices of the electronic apparatus, and (3) saving the output power of the external power source.

The invention achieves the above-identified objects by providing an electronic apparatus capable of using an external power source and a power source from a bus, such as a universal serial bus (USB) power source. The electronic apparatus is coupled to both the external power source and the USB power source. The external power source and the USB power source output a first operating voltage and a second operating voltage, respectively, to the electronic apparatus. The electronic apparatus includes a first group of devices, a second group of devices, and an input power control circuit. The first group of devices is operative at the first operating voltage. The second group of devices is operative at the second operating voltage. The input power control circuit is coupled to the first group of devices and the second group of devices, and is capable of being coupled to the external power source and the USB power source. The input power control circuit is used for controlling the first and the second operating voltages in order to feed the respective first group of devices and second group of devices. The input power control circuit functions to feed the first operating voltage to the first group of devices and then the second operating voltage to the second group of devices.

Other objects, features, and advantages of the invention will become apparent from the following detailed description of the preferred but non-limiting embodiments. The following description is made with reference to the accompanying drawings.

DETAILED DESCRIPTION OF THE INVENTION

The principle of the invention is that an electronic apparatus, such as a scanner, is simultaneously coupled to an external power source supplying a high operating voltage and a power source from a bus, such as a USB power source, supplying a low operating voltage. In addition, under the control of an input power control circuit, after the high operating voltage provided by the external power source is fed to the scanner, the low operating voltage provided by the USB power source is then fed to the scanner.

Figure 1:
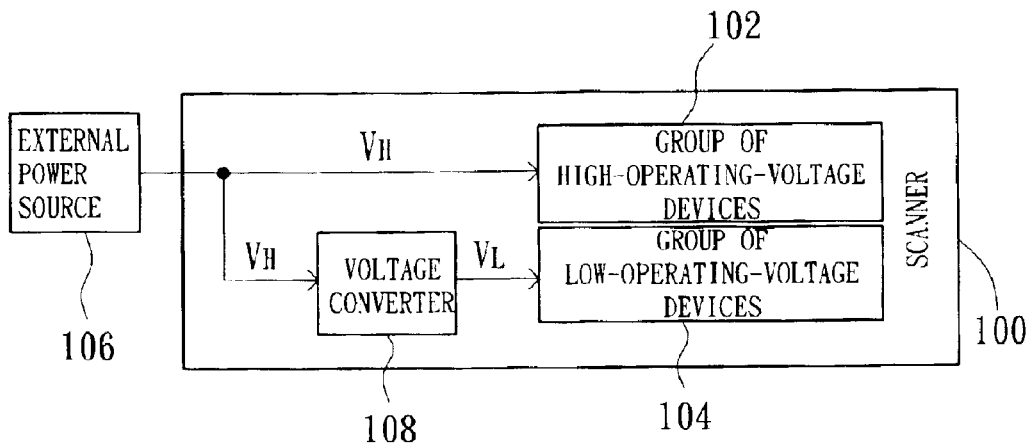
FIG. 1 illustrates the connection of a conventional scanner 100 to an external power source 106.
Figure 2:
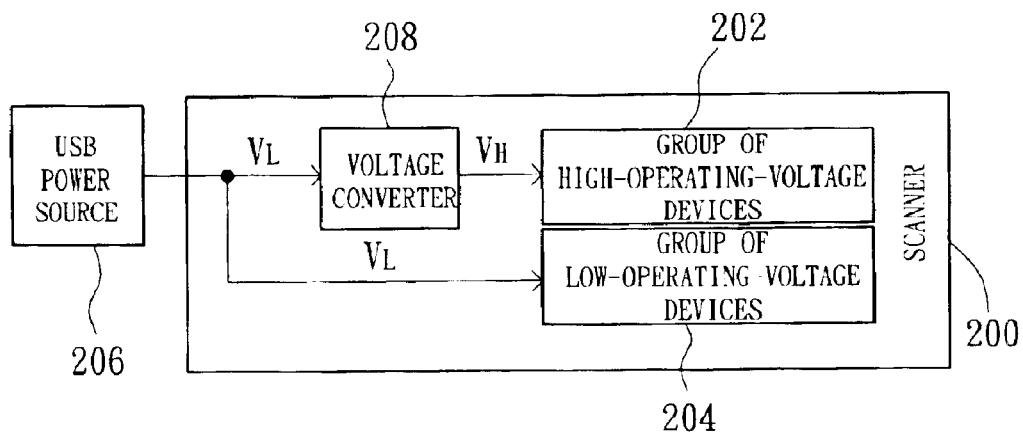
FIG. 2 illustrates the connection of another conventional scanner 200 and a USB power source 206.
Figure 3:
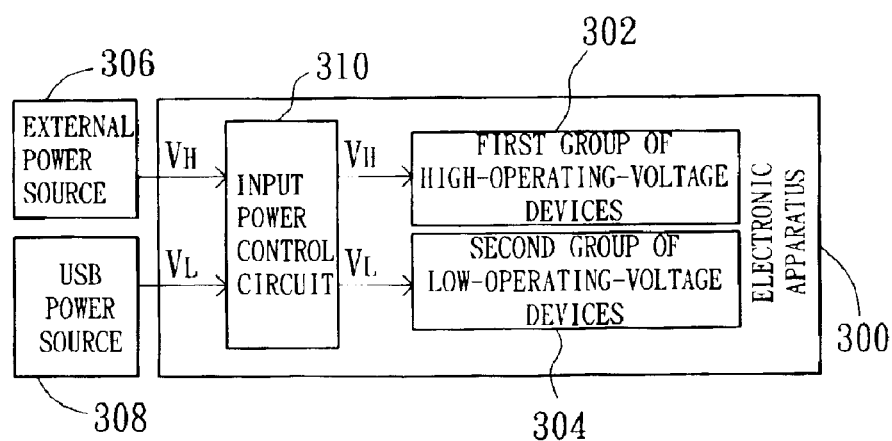
FIG. 3 illustrates the connection of an external power source 306, a USB power source 308, and an electronic apparatus capable of using the external power source 306 and the USB power source 308 according to a preferred embodiment of the invention.

As shown in FIG. 3, an electronic apparatus, such as a scanner 300, capable of using an external power source 306 and a USB power source 308, according to one preferred embodiment of the invention, is connected to the external power source 306 and the USB power source 308. As described above, the scanner 300 includes two groups of devices: a first group of high-operating-voltage devices 302, directly or indirectly operative at 12 V DC, and a second group of low-operating-voltage devices 304, directly or indirectly operative at 5 V DC. In addition, the first group of high-operating-voltage devices 302 and the second group of low-operating-voltage devices 304 are independent, such that, they are operative at their respective operating voltages. Please note that although some electronic devices may use both the operating voltages of 12 and 5 V DC simultaneously, they will not be described specifically in the following for the sake of simplicity.

In one embodiment of the present invention, the scanner 300 is coupled to the external power source 306 and the USB power source 308 simultaneously. The external power source 306 outputs a high operating voltage $V_H$ of 12 V DC, capable of supplying power to the first group of high-operating-voltage devices 302. The USB power source 308 outputs a low operating voltage $V_L$ of 5 V DC, capable of supplying power to the second group of low-operating-voltage devices 304. The scanner 300 also includes an input power control circuit 310. The input power control circuit 310 is coupled to both the first group of high-operating-voltage devices 302 and the second group low-operating-voltage devices 304. The input power control circuit 310 is capable of being coupled to the external power source 306 and the USB power source 308. The input power control circuit 310 is used for controlling the input of the high operating voltage $V_H$ and the low operating voltage $V_L$ to the first group of high-operating-voltage devices 302 and the second group of low-operating-voltage devices 304, respectively. In order to avoid unexpected operations due to feeding the low operating voltage $V_L$ or the high operating voltage $V_H$ to the scanner 300 too early, the input power control circuit 310 can determine when each of the two different operating voltages is fed. In this embodiment, the input power control circuit 310 first feeds the high operating voltage $V_H$ to the first group of high-operating-voltage devices 302 and then feeds the low operating voltage $V_L$ to the second group of low-operating-voltage devices 304.

Figure 4:
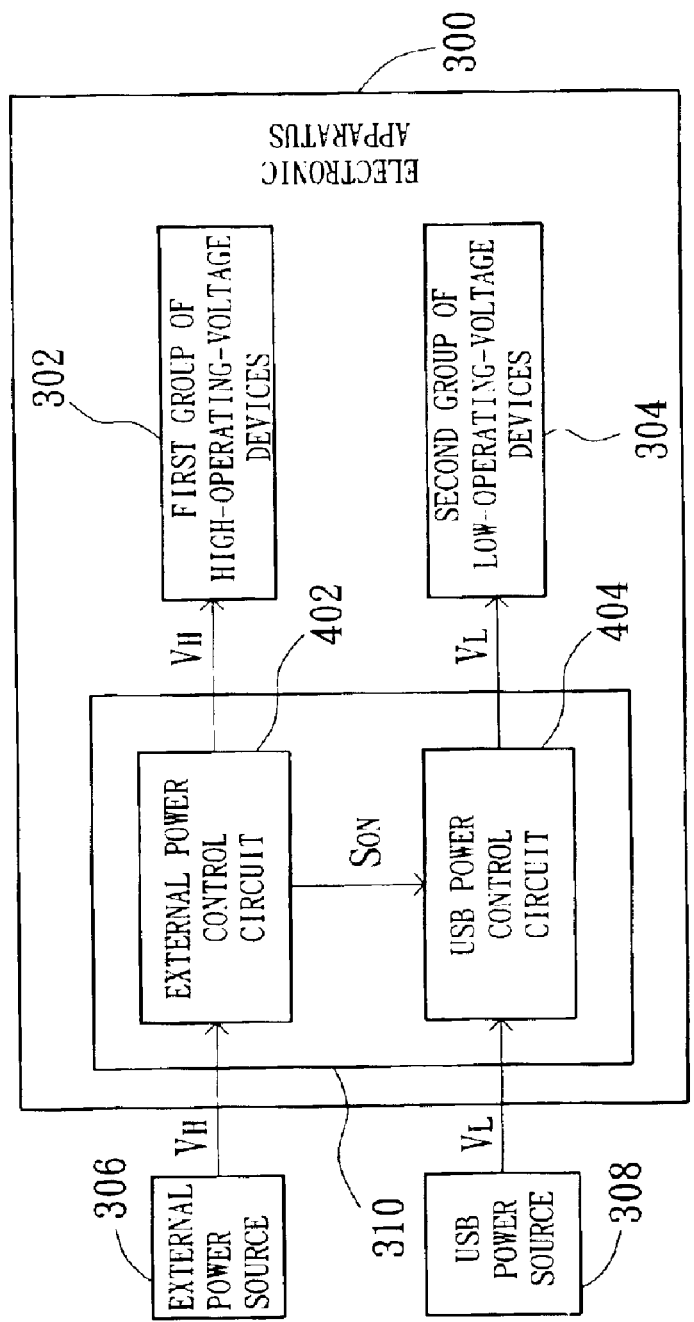
FIG. 4 illustrates the structure of an input power control device 310 according to a preferred embodiment of the invention.

FIG. 4 illustrates the structure of an input power control device 310. The input power control device 310 includes an external power control circuit 402 and a USB power control circuit 404. The external power control circuit 402 is coupled to the first group of high-operating-voltage devices 302 and the external power source 306. The USB power control circuit 404 is coupled to the second group of low-operating-voltage devices 304, the external power control circuit 402, and the USB power source 308. When the high operating voltage $V_H$ is fed to the input power control circuit 310, the external power control circuit 402 first feeds the high operating voltage $V_H$ to the first group of high-operating-voltage devices 302. Next, the external power control circuit 402 allows the USB power control circuit 404 to feed the low operating voltage $V_L$ to the second group of low-operating-voltage devices 304 by outputting a control signal $S_{ON}$ to the USB power control circuit 404.

In this embodiment, the scanner 300 is coupled to the external power source 306 for providing the high operating voltage $V_H$, and the USB power source 308 for providing the low operating voltage VL. Thus, the scanner 300 has no need for converting the input voltages into the operating voltages of electronic devices inside the scanner 300, and thus reducing unnecessary power dissipation. Accordingly, thermal drifting of the electronic devices inside the scanner 300 due to the heat dissipation generated during voltage conversion would be avoided. Therefore, signal distortion due to thermal drifting would be avoided, and the scanning quality would not be degraded.

In addition, under the control of the input power control circuit 310, the high operating voltage $V_H$ can first be fed to the first group of high-operating-voltage devices 302 and then the low operating voltage $V_L$ can be fed to the second group of low-operating-voltage devices 304. The scanner 300 is operative only when the supply of the two different operating voltages $V_H$ and $V_L$ is stabilized. Thus, damage of the internal devices of the scanner 300 due to unstable power supply can be prevented and the lifetime of the scanner 300 can be increased because the scanner 300 is operative only when the user operates the scanner 300 in a proper starting procedure.

The scanner 300 in this embodiment obtains the necessary power from the external power source 306 and the USB power source 308 simultaneously. The high operating voltage $V_H$ outputted by the external power source 306 is supplied to the first group of high-operating-voltage devices 302 only. The USB power source 308 is also an external power source, for example, a device of a personal computer. However, in terms of power efficiency, the direct use of the 5V DC provided by the USB power source 308 in the scanner 300 is more efficient than the additional converter adopted by the conventional scanners by which a 12 V DC is converted into a 5 V DC. For a personal computer, a highly efficient voltage converter is commonly used to supply a 5 V DC; on the other hand, the conventional scanner adopts a simpler voltage converter for the sake of low production cost. Thus, according to the invention, although the power dissipated by the first group of high-operating-voltage devices 302 and the second group of low-operating-voltage devices 304 of the scanner 300 remains unchanged, the scanner 300 does operate at a reduced operating temperature, and if the personal computer of the USB power source 308 is taken into account, the total energy usage efficiency is enhanced and the total energy dissipation is reduced indeed.

In addition to scanners, the principle of the invention can be applied to other electronic apparatuses. If the internal electronic devices of an electronic apparatus use two different operating voltages respectively, the electronic apparatus can use an external power source and a USB power source simultaneously as its operating power sources.

As disclosed above, the scanner that uses the external power source and the USB power source simultaneously can achieve the following advantages.

1. Thermal drifting of the internal electronic devices is decreased due to reducing power dissipation. The scanner does not need to convert the input voltage into the operating voltage for the electronic devices inside the scanner, thus reducing the power dissipation and thus, preventing thermal drifting of the internal electronic devices that would affect the operation of the scanner.

2. Undesired erroneous operations are prevented and the lifetime of the scanner is increased. Damage to the internal electronic devices of the scanner can be reduced by using the input power control circuit to ensure that the scanner is operative only if the scanner is operated through by a proper starting procedure. Thus, the decrease in damage of the internal electronic devices can result in an increase in the lifetime of the scanner.

3. An external power source can use a reduced power, and thus, power saving can be achieved. Since the high operating voltage outputted by the external power source is only applied to the first group of high-operating-voltage devices of the scanner, a reduced power is required of the external power source, thus saving power.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic apparatus capable of using an external power source and a universal serial bus (USB) power source, the electronic apparatus being coupled to both the external power source and the USB power source, the external power source outputting a first operating voltage, and the USB power source outputting a second operating voltage, the electronic apparatus comprising:

a first group of devices operated by the first operating voltage;

a second group of devices operated by the second operating voltage; and an input power control circuit coupled to the external power source, the USB power source, the first group of devices, and the second group of the devices, the input power control circuit being used for controlling inputs of the first and the second operating voltages to the first and second groups of devices, respectively;

wherein the input power control circuit is used to feed the first operating voltage to the first group of devices and then feed the second operating voltage to the second group of devices.

2. The electronic apparatus according to claim 1, wherein the input power control circuit comprises:

an external power control circuit, respectively coupled to the first group of devices and the external power source, the external power control circuit being used to control an input of the first operating voltage from the external power source to the first group of devices; and a USB power control circuit coupled to the second group of devices, the external power control circuit, and the USB power source, the USB power control circuit being used for controlling an input of the second operating voltage from the USB power source to the second group of devices;

wherein when the first operating voltage is fed to the input power control circuit, the external power control circuit first feeds the first operating voltage to the first group of devices and then outputs a control signal to the USB power control circuit to allow the USB power control circuit to feed the second operating voltage to the second group of devices.

3. The electronic apparatus according to claim 1, wherein the electronic apparatus is a scanner.

4. An electronic apparatus, coupled to an external power source and a bus, the external power source outputting a first operating voltage to the electronic apparatus, and the bus providing data and a second operating voltage for the electronic apparatus, the electronic apparatus comprising:

a first group of devices operated by the first operating voltage;

a second group of devices operated by the second operating voltage; and an input power control circuit, coupled to the first group of devices, and the second group of devices, the external power source, and the bus, the input power control circuit being used for controlling the first and the second operating voltages in order to apply the first and the second operating voltages to the first group of devices and the second group of devices respectively, wherein the input power control circuit first applies the first operating voltage to the first group of devices and then applies the second operating voltage to the second group of devices.

5. The electronic apparatus according to claim 4, wherein the input power control circuit comprises:

an external power control circuit, coupled to the first group of devices and the external power source, the external power control circuit being used for controlling the first operating voltage from the external power source in order to feed the first group of devices with the first operating voltage; and a bus power control circuit, respectively coupled to the second group of devices, the external power control circuit, and the bus, the bus power control circuit being used for controlling the second operating voltage from the bus in order to feed the second group of devices with the second operating voltage;

wherein when the first operating voltage is fed to the input power control circuit, the external power control circuit first feeds the first operating voltage to the first group of devices and then outputs a control signal to the bus power control circuit in order to allow the bus power control circuit to feed the second operating voltage to the second group of devices.

* * * * *